_United States Patent_ [19]

Schultz et al.

[11] 3,904,701

[45] Sept. 9, 1975

[54] PROCESS FOR THE CATALYTIC HYDROFLUORINATION OF HALOGENATED HYDROCARBONS

[75] Inventors: Neithart Schultz, Eichsel, uber Rheinfelden; Hans-Joachim Vahlensieck, Wehr, Baden; Rudolf Gebele, Rheinfelden, all of Germany

[73] Assignee: Dynamit Nobel Aktiengesellschaft, Troisdorf, Germany

[22] Filed: Mar. 26, 1973

[21] Appl. No.: 344,673

Related U.S. Application Data

[63] Continuation of Ser. No. 889,301, Dec. 30, 1969, abandoned.

[30] Foreign Application Priority Data

Jan. 3, 1969  Germany............................ 1900241

[52] U.S. Cl. ............. 260/653.6; 252/441; 252/442; 260/653.7

[51] Int. Cl....................... C07c 17/08; C07c 17/20

[58] Field of Search...................... 260/653.6, 653.7

[56] References Cited

UNITED STATES PATENTS

| | | | |
|---|---|---|---|
| 2,005,707 | 6/1935 | Daudt et al. ...................... | 260/653.6 |
| 2,585,644 | 2/1952 | Fowler et al. ..................... | 260/653.8 |
| 3,591,646 | 7/1961 | Vecchio et al. ................... | 260/653.6 |

FOREIGN PATENTS OR APPLICATIONS 7,000,012 7/1970 Netherlands.................... 260/653.7

Primary Examiner—D. Horwitz
Attorney, Agent, or Firm—Burgess, Dinklage & Sprung

[57] ABSTRACT

Improvement in the catalytic hydrofluorination of halogenated hydrocarbons by carrying out the hydrofluorination with a catalyst which is 0.1 to 20 wt. % bismuth, 35 to 66 wt. % fluorine, 24 to 42 wt. % aluminum, and the remainder oxygen. A preferred catalyst also contains manganese.

9 Claims, No Drawings

PROCESS FOR THE CATALYTIC HYDROFLUORINATION OF HALOGENATED HYDROCARBONS

This is a continuation of application Ser. No. 889,301 filed Dec. 30, 1969 now abandoned.

It is in the prior art to catalytically hydrofluorinate halogenated aliphatic compounds in order to partially or completely replace chlorine with fluorine, either in the gas phase or in the liquid phase. The catalysts for the gas phase reaction are often oxides or halides of metals having atomic numbers between 11 (Na) and 30 (Zn), with or without carbon as a supporting material, while the liquid phase reaction is catalyzed by antimony halides. It is also in the prior art to use as the catalyst aluminum oxide mixed with halides of chromium, cobalt, nickel, copper or palladium. These known methods have been used for the hydrofluorination of halogenated methane derivatives and, to some extent, halogenated hydrocarbons having two or more carbon atoms.

An important disadvantage of these known catalytic hydrofluorination processes lies in the low activity of the catalysts.

The yields of fluorinated product produced by prior art processes are considerably less than could be expected if complete conversion of the halogenated hydrocarbon were achieved. Further, there is considerable contamination of the desired products with unreacted starting materials and, in some cases, partially fluorinated intermediate products and by-products. Purification is therefore necessary, which entails additional expense.

There has been noted with prior art catalysts a very rapid reduction of the catalytic activity and hence rapid reduction of the conversion of the halogenated hydrocarbons. Consequently the catalysts have to be regenerated frequently and soon entirely lose their activity.

It is known to improve the catalyst activity by utilizing high reaction temperatures but this has a negative influence on the life, not only of the catalysts, but also of the organic compounds participating in the reactions. At the reaction temperatures, which usually range from 280° to 400°C, an acceleration of undesirable chemical and physical reactions takes place, especially in the surface of the catalysts. Decomposition reactions occur with many halogenated hydrocarbons, resulting in a further reduction of the yield and in the precipitation of carbon on the catalyst. The catalyst must therefore be regenerated by burning off the carbon with air at 500° to 600°C, which reduces the active surface area to an undesirable extent for example by sintering phenomena. The frequent and great temperature variations diminish the mechanical stability of the catalyst, sometimes resulting in the development of powdered catalysts which can result in an at least partial clogging of the installation and thus constitute a threat to continuity of operation.

Another disadvantage of the processes hitherto known is the very high concentration of hydrogen fluoride that had to be used to achieve relatively high conversions. The excess hydrogen fluoride can be recovered only at great trouble and expense. Even if one desires to forego such recovery, it is still expensive and a technical problem to render this acid harmless.

It has now been found that fluorinated aliphatic or cycloaliphatic hydrocarbons having two and more carbon atoms can be efficiently prepared by the catalytic hydrofluorination of halogenated corresponding hydrocarbons having fewer fluorine substituents than the fluorine content of the desired product if the halogenated hydrocarbon reactants are reacted with excess hydrogen fluoride in the presence of a particular, novel catalyst at temperatures between 120°C and 400°C, preferably between 150° and 240°C, and at residence times of 0.1 to 40 sec., preferably 1 to 20 sec. The catalyst of this invention is prepared by the hydrofluorination of $\gamma$ or $\eta$-aluminum oxide impregnated with bismuth salts and consists of 0.1 to 20 wt.% bismuth, 35 to 66 wt.% fluorine, 24 to 42 wt.% aluminum, and the rest oxygen.

When the catalyst according to the invention is used within the described process parameters, the disadvantages of the prior art processes, which have been described above, do not occur. Instead, it is possible to perform the hydrofluorination reaction with only a slight excess of hydrogen fluoride, short residence times, and relatively low temperatures. As a result of the relatively low reaction temperature and the rapid and high conversions, the halogenated hydrocarbons subjected to hydrofluorination remain sufficiently stable in the reaction chamber so that the danger of thermal decomposition thereof is slight. Consequently, by the process according to the invention, substantially quantitative yields are obtained which have little or no contamination with starting or intermediate materials.

Another advantage of the process of this invention is the long catalyst life, which can amount to several weeks without appreciable loss of activity.

The regeneration of the catalyst is performed simply by passing air over it and heating it to temperatures between 350° and 450°C. Prior to regeneration, the catalyst is dark-colored because of precipitated carbon; however, it recovers its bright appearance upon regeneration.

Another aspect of this invention lies in the discovery that it is possible to regenerate the catalyst at even lower temperatures 250°–300°C) if the catalyst additionally contains manganese salts in quantities of about 0.1 to 70%, preferably 7 to 340, of the weight of the catalyst. It is preferred to use manganese salts having the same anions as those of the bismuth salts used in catalyst preparation. The catalytic activity of the catalyst is not diminished by this inclusion of manganese salts. The process of the present invention is suitably carried out employing a catalyst which contains between 50 and 58 weight percent fluorine, between 2 and 8% bismuth, between 31 and 36 weight percent aluminum, the balance being oxygen. The catalyst can suitably be prepared by a process in which $\gamma$ or $\eta$-alumina is heated to a temperature between 50° and 120°C in a vacuum below 1.0 torr. The alumina is impregnated with a substantially homogeneous solution of a bismuth salt and is thereafter heated in a nitrogen atmosphere to dry the same. It is thereafter heated in the presence of hydrogen fluoride and air. The hydrogen fluoride concentration is increased until cessation of the exothermic reaction ensues.

The catalyst is preferably prepared by:

heating $\gamma$ or $\eta$-aluminum oxide for about 1 hour at 80°C in a vacuum of less than 1 Torr, and then saturating such with an aqueous solution of a suitable bismuth salt, which also can contain soluble manganese salts.

To achieve a homogeneous solution of the bismuth salt, an appropriate acid pH is established in the solution and/or complex formers are added to the solution. Examples of suitable complex formers are hydroxyl-group-containing organic compounds from the group of the sugar alcohols, such as mannitol, sorbitol or ribitol, hydroxy acids such as tartaric acid, lactic acid or the sugar acids. Amines and nitriles are also suitable as complex formers, examples being ethylene diamine, nitrilotriacetic acid, succinodinitrile, etc.

Suitable bismuth and manganese salts are usually water-soluble or acid-soluble materials, whose solution is stabilized, if desired, by the above-mentioned complex formers.

It is preferable to use the bismuth or bismuth oxy salts of nitric acid, sulfuric acid, hydrochloric acid or perchloric acid.

The concentration of the bismuth salt solution eventually containing manganese salts is not critical to the process, but rather is selected to obtain the desired bismuth or manganese content in the catalyst.

The aluminum oxide impregnated with the bismuth and manganese solution is then dried at temperatures up to 100°C, and then is heated in a nitrogen atmosphere to 150° to 250°C. At this temperature, after drying has been completed, the nitrogen is replaced by air mixed with an increasing concentration of hydrogen fluoride. As the exothermic reaction proceeds, the hydrogen fluoride concentration is increased until the atmosphere is 100% hydrogen fluoride at the end of the reaction.

The halogenated hydrocarbons are mixed in the gaseous phase with excess hydrogen fluoride in the required molar ratio, preheated to the required reaction temperature, and, after thorough mixing, passed over the catalyst while the latter is maintained at a temperature between about 120° and 400°C, preferably bwtween 150° and 250°C. The hydrogen fluoride excess is about 1 to 50 mole %, preferably 5 to 20 mole %, of the stoichiometrically required quantity, with reference to the halogenated hydrocarbon input. The catalyst can be used either as a solid bed or as a fluidized bed catalyst.

By the process of the invention, aliphatic and cycloaliphatic saturated and unsaturated halogenated hydrocarbons having two and more carbon atoms can be hydrofluorinated.

The following are examples of aliphatic unsaturated halogenated hydrocarbons: vinyl chloride, vinyl fluoride, 1,1-dichlorethylene, 1,1-difluorethylene, trichlorethylene, and perchlorethylene. Examples of saturated halogenated hydrocarbons are: 1,1,1-trichlorethane, 1,1-dichlorethane, 1,1,1,2-tetrachlorethane and hexachlorethane. An example of a cyclic halogenated hydrocarbon is hexachlorocyclopentadiene.

The products of this process are valuable refrigerants, solvents and intermediates in organic polymer chemistry.

The process will be further explained with the aid of the following examples:

EXAMPLE 1

To prepare the catalyst, 650 g of γ-aluminum oxide in pellets of 3 mm diameter were subjected to a vacuum of $10^{-2}$ Torr for 1 hour at 80°C in a glass tube provided with a heating jacket. They were then cooled in the vacuum to room temperature, and a solution of 153 g of $Bi(NO_3)_3 \cdot 5 H_2O$ and 66 g of mannitol in 1,000 ml of water was allowed to flow into the tube. The impregnated pellets were then exposed to the air and let stand for 1 hour at 80°C. Then the aqueous phase was drawn off and the catalyst was given a first drying in a vacuum produced by a water-jet pump.

For the hydrofluorination, the catalyst was placed in a double-jacketed nickel tube 150 cm long and 5 cm in diameter, the temperature of which could be regulated by circulating oil. At 200°C the catalyst was thoroughly dried with nitrogen and then activated with a mixture of air and an increasing concentration of hydrogen fluoride. By varying the HF concentration the temperature was kept constantly below 250°C. After a 100% HF current was reached, the treatment was continued for 1 hour, and then the catalyst was dried with air for 1 hour. The fluoride content of the catalyst then amounted to about 50%, and the bismuth content to about 5%.

A gaseous mixture of 1 part 1,1-dichloroethylene and 3.2 parts HF, preheated to 180°C, was made to flow through the catalyst thus prepared, with a residence time of 18 sec. After the washing and drying of the reaction product, a mixture was obtained containing

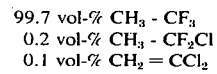

99.7 vol-% $CH_3 - CF_3$
0.2 vol-% $CH_3 - CF_2Cl$
0.1 vol-% $CH_2 = CCl_2$

The temperature along the catalyst ran around 198° to 210°C. Over a period of several weeks the catalyst showed only a very slight loss of activity.

EXAMPLE 2

A gaseous mixture of 1 part vinyl fluoride and 1.2 parts hydrogen fluoride, preheated to 80°C, is passed through a catalyst prepared as in Example 1, at a temperature of 160°C, with a residence time of 8 seconds. After the washing and drying of the reaction product, the latter consists of: 98.8 vol-% difluorethane and 1.2 vol-% vinyl fluoride.

EXAMPLE 3

A catalyst was prepared analogously to Example 1 from 715 g of aluminum oxide and a solution of 168 G of $Bi(NO_3)_3 \cdot 5H_2O$ and 75 ml of 13N nitric acid in 900 ml of water. Through the catalyst, when it is ready for use (Bi content about 6%), there is passed, at 205°–220°C, a gaseous mixture of 3.7 parts HF and 1 part vinylidene chloride, preheated to 190°C, with a residence time of 10 seconds. The washed and dried reaction product consists of:

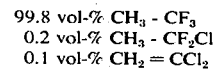

99.8 vol-% $CH_3 - CF_3$
0.2 vol-% $CH_3 - CF_2Cl$
0.1 vol-% $CH_2 = CCl_2$

EXAMPLE 4

A gaseous mixture of 3.3 parts of hydrogen fluoride and 1 part of vinylidene chloride, preheated to 200°C, is passed through a catalyst prepared according to Example 1 from 710 g of aluminum oxide and a solution of 84 g of $Bi(NO_3)_3 \cdot 5 H_2O$ and 75 ml of 13N nitric acid in 900 ml $H_2O$ (Bi content approximately 3%) at a temperature of 210° to 225°C, with a residence time of 8 sec. After washing and drying, the reaction product contained:

```
98.9 vol-% CH₃ - CF₃
 0.4 vol-% CH₃ - CF₂Cl
 0.7 vol-% CH₂ = CCl₂
```

EXAMPLE 5

A catalyst prepared from 710 g Al$_2$O$_3$ and 1 liter of an aqueous solution of 30 g Bi(NO$_3$)$_3$ . 5 H$_2$O and 70 ml of 13N nitric acid, analogously to Example 1, contains approximately 1% bismuth. With a gaseous mixture of 3.4 parts HF and 1 part CH$_2$ = CCl$_2$, preheated to 210°C, passed through this catalyst at 215° to 225°C with a residence time of 30 sec., the washed and dried product consists of:

```
99.6 vol-% CH₃ - CF₃
 0.2 vol-% CH₃ - CF₂Cl
 0.2 vol-% CH₂ = CCl₂
```

What is claimed is:

1. In the process for reacting a halogenated aliphatic or cycloaliphatic hydrocarbon having at least 2 carbon atoms with hydrogen fluoride to prepare the corresponding fluorinated hydrocarbon having more fluorine than the halogenated aliphatic or cycloaliphatic hydrocarbon reactant at a temperature of about 150° to 240°C. at a residence time of about 0.1 to 40 seconds in the presence of a bismuth containing alumina catalyst; the improvement which comprises using as the catalyst a composition consisting essentially of a γ or η-aluminum oxide, 0.1 to 20 weight percent bismuth as a bismuth salt, said catalyst prepared by:

A. Heating γ or η-alumina to about 50° to 120°C;

B. Impregnating said alumina with a substantially homogeneous solution of a water soluble bismuth salt;

C. Drying the so impregnated alumina;

D. Heating said dry impregnated alumina in the presence of hydrogen fluoride and air; and E. Increasing the proportion of hydrogen fluoride in said air until cessation of the exothermic reaction which ensues whereby said catalyst contains 0.01 to 20 weight percent bismuth, 35 to 66 weight percent fluorine and 24 to 42 weight percent aluminum.

2. The process claimed in claim 1 carried out with a 1 to 20 seconds residence time.

3. The process claimed in claim 1 wherein the catalyst is 50 to 58 weight percent fluorine, 2 to 8 weight percent bismuth, 31 to 36 weight percent aluminum, and the remainder oxygen.

4. The process claimed in claim 1 wherein said catalyst further contains 0.1–10 weight percent manganese, based on the weight of the catalyst.

5. The process claimed in claim 1 wherein said hydrogen fluoride reactant is fed in a mol ratio excess of about 1 to 50 mol percent.

6. The improved process claimed in claim 1 wherein said hydrogen fluoride reactant is fed in a mol ratio excess of about 5 to 20 mol percent.

7. A process according to claim 1 wherein the catalyst additionally contains up to 10 weight percent manganese in the form of a manganese salt and the alumina which is subjected to the hydrogen fluoride treatment in steps D and E already contains manganese.

8. A process according to claim 1 wherein step C is carried out by heating the impregnated alumina in a nitrogen atmosphere.

9. A process according to claim 1 wherein step A is conducted employing a vacuum.

* * * * *

UNITED STATES PATENT OFFICE
CERTIFICATE OF CORRECTION

PATENT NO. : 3,904,701
DATED : SEPTEMBER 9, 1975
INVENTOR(S) : NEITHART SCHULTZ, HANS-JOACHIM VAHLENSIECK, RUDOLF GEBELE

It is certified that error appears in the above-identified patent and that said Letters Patent are hereby corrected as shown below:

Column 2, line 42, "70%" should read -- 10% --; "7 to 340" should read -- 1 to 3% --.

Signed and Sealed this sixteenth Day of December 1975

[SEAL]

Attest:

RUTH C. MASON
*Attesting Officer*

C. MARSHALL DANN
*Commissioner of Patents and Trademarks*